Feb. 3, 1931.                R. E. LYFORD                 1,790,672
                       BRAKE OPERATING MECHANISM
                         Filed Dec. 29, 1926
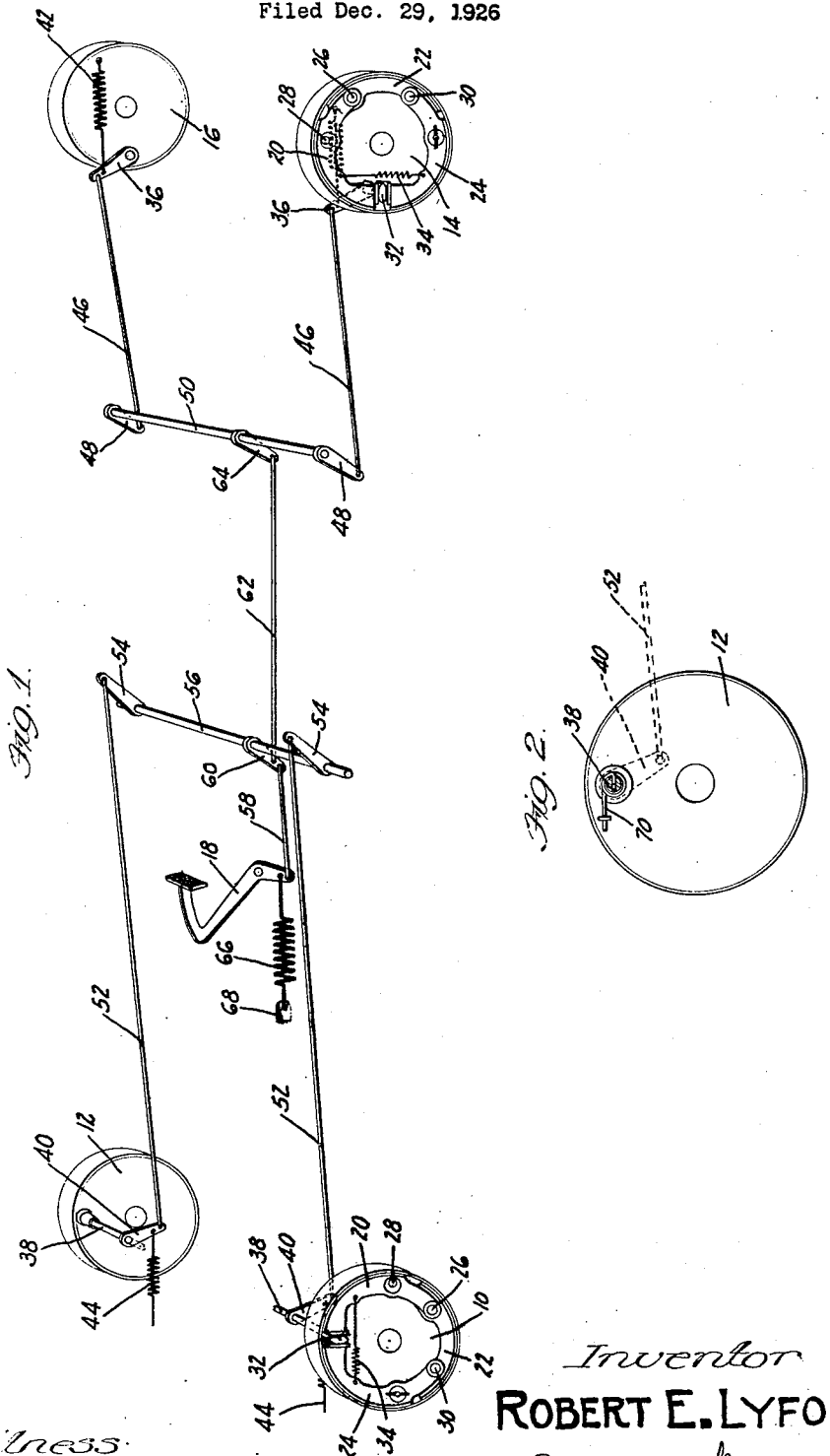
Inventor
ROBERT E. LYFORD Patented Feb. 3, 1931

1,790,672

UNITED STATES PATENT OFFICE

ROBERT E. LYFORD, OF CHICAGO, ILLINOIS, ASSIGNOR TO BENDIX BRAKE COMPANY, OF CHICAGO, ILLINOIS, A CORPORATION OF ILLINOIS

BRAKE-OPERATING MECHANISM

Application filed December 29, 1926. Serial No. 157,702.

This invention relates to brakes, and is illustrated as embodied in a system of four-wheel automobile brakes. An object of the invention is to provide an inexpensive system of brake-operating connections which is held under a yielding tension, thus preventing rattle and lessening the wear of the connections.

In one desirable arrangement there is a spring, or other yielding device, adjacent the brake (or adjacent each brake of the system) which acts in a direction to apply the brake, and which is overcome by means such as a stronger spring arranged to act in a direction to prevent the application of the brake.

Preferably the stronger central spring is connected to the brake pedal, or other operating or controlling member, or at least is arranged adjacent thereto, so that the oppositely-acting springs hold the entire brake-applying mechanism under tension.

This permits adjustment of the brakes to a minimum clearance, so that practically the entire length of the pedal travel is utilized in applying the brakes, there being no lost motion to be taken up in the connections. The springs automatically take up for wear in the connections, and since this is in a direction opposite to lost motion caused by lining wear, it partially compensates therefor, and decreases the frequency of adjustment required. Since all of the connections are tension members, and since any stretch in the connections is automatically taken up, relatively light and inexpensive cable can be used. Moreover, as a safety measure, if there is a breakage anywhere in the connections, the brake or brakes will automatically be applied by their respective springs.

The above and other objects and features of the invention will be apparent from the following description of the illustrative embodiment shown in the accompanying drawing, in which:

Figure 1 is a diagrammatic perspective view of so much of an automobile chassis as is included in my novel braking system; and Figure 2 is a vertical section looking outwardly at the right front brake, and showing a different spring arrangement.

In the arrangement illustrated in Figure 1, there are left and right front brakes 10 and 12, and left and right rear brakes 14 and 16, all acting on the road wheels (not shown), and all controlled by a single member such as a brake pedal 18.

Each brake may include three shoes 20, 22, and 24, the heads of the drums of the left front brake 10 and the left rear brake 14 being broken away to show the shoes in side elevation. Shoe 20 is shown anchored on a stationary pivot 26 and shoe 22 on a similar pivot 28, the shoes being overlapped at their adjacent ends, while shoe 24 is connected to the unanchored end of shoe 22 by a floating pivot 30. The brakes are applied by suitable devices such as cams 32, against the resistance of return springs 34.

Cams 32 of the rear brakes have short shafts on which are fixed operating arms 36, while cams 32 of the front brakes are universally jointed to Perrot-type control shafts 38 supported at their inner ends on the chassis frame (not shown) and on which are fixed the operating arms 40.

The brakes may be substantially as more fully described in Patent No. 1,567,716, granted Bendix Brake Company on December 29, 1925, on application of A. Y. Dodge, while the Perrot-type controls 38 may be substantially as more fully described in Patent No. 1,604,394, granted Bendix Brake Company on October 26, 1926, on application of A. Y. Dodge.

The present invention relates to the means, controlled by pedal 18 or its equivalent, for applying the brakes. Each of the brakes is provided with a device such as a spring acting in a direction to apply the brake, the springs 42 of the rear brakes being tensioned between arms 36 and fixed parts such as the backing plates of the brakes, while the springs 44 of the front brakes are tensioned between arms 40 and the chassis frame (not shown) ahead of the brakes.

In the particular hookup shown, and which is capable of variation in many ways, the arms 36 of the rear brakes are connected by cables or tension rods 46 to arms 48 on a shaft 50, while arms 40 of the front brakes are connected by cables or links 52 to arms 54 on a shaft 56. Pedal 18 is connected by a cable or link 58 to an arm 60 on shaft 56 and by a further cable or link 62 to an arm 64 on shaft 50, so that all four brakes are controlled by the one pedal.

According to a very important feature of the invention, there is a single spring 66, or an equivalent yielding means, preferably acting on the pedal 18 and illustrated as tensioned between the pedal and a fixed part 68. This spring is strong enough to overcome all four of the springs 42 and 44 and prevent them from applying the brakes, but can itself be overcome or neutralized by pedal 18 to permit the various springs 42 and 44 to apply their respective brakes.

As shown in Figure 2, a torsion spring 70 may be substituted for the simple coil spring 44 or 42. As this view is in a plane just inside the backing plate of the right front brake 12, looking outwardly, the arm 40 and connection 52 would not show, so their positions are indicated by dotted lines.

It will be seen that spring 66 normally holds the pedal 18 in an upper position determined in any usual manner, as for example by the floor board or by any suitable stop. When the pedal is depressed, overcoming the spring 66, each of the springs 44 and 42 acts to apply its brake. As the force which can be applied to the brakes is limited by the strength of springs 44 and 42, it can be so adjusted that under ordinary conditions the driver cannot lock the wheels.

As the released position of pedal 18 is fixed, all wear in the connections is taken up by springs 44 and 42, which act to turn the cams 32 toward brake-applying position, thus partially compensating for the wear of the lining of the brake shoes.

Levers 38 and 40 may be so adjusted that there is barely a minimum clearance between the shoes and drum of each brake, when the brake is released. Since there is no lost motion to be taken up in the connections, depression of pedal 18 immediately begins to apply the brakes, and the further the pedal is depressed the more power is applied to the brakes by springs 44 and 42. Thus the full stroke of the pedal is available for graduating the brake-applying force, instead of it being required to take up lost motion and yield in the connections.

While one illustrative embodiment has been described in detail, it is not my intention to limit the scope of the invention to that particular embodiment, or otherwise than by the terms of the appended claims.

I claim:

1. Retarding mechanism comprising, in combination, a brake, a spring constantly tensioned and acting in a direction to apply the brake, a stronger spring arranged to overcome the first spring and prevent application of the brake, and means for overcoming the stronger spring to permit the first spring to apply the brake.

2. Retarding mechanism comprising, in combination, a brake, a spring constantly tensioned and acting in a direction to apply the brake, and a stronger spring arranged to overcome the first spring and prevent application of the brake.

3. Retarding mechanism for a vehicle comprising, in combination, a plurality of brakes acting on the various wheels of the vehicle, a device for each brake constantly acting in a direction to apply its brake, yielding means for overcoming the several devices to prevent the application of the brakes, and a driver-controlled part for neutralizing the action of said means to permit said devices to apply their respective brakes.

4. Retarding mechanism for a vehicle comprising, in combination, a plurality of brakes acting on the various wheels of the vehicle, a spring for each brake constantly acting in a direction to apply its brake, yielding means for overcoming the several springs to prevent the application of the brakes, and a driver-controlled part for neutralizing the action of said means to permit said devices to apply their respective brakes.

5. Retarding mechanism for a vehicle comprising, in combination, a plurality of brakes acting on the various wheels of the vehicle, a spring for each brake constantly acting in a direction to apply its brake, a single spring means arranged to overcome all of the brake springs and prevent application of the brakes, and means for overcoming said single spring means to permit the brake springs to apply the respective brakes.

6. A braking system comprising, in combination, a plurality of brakes, means adjacent each brake acting yieldingly in a direction to apply the brake, a single controlling member for all of the brakes, connections from said member to the various brakes, and means adjacent the controlling member and acting through the connections to prevent the application of the brakes by said yielding means and arranged to be neutralized by the controlling member to permit the several yielding means to apply their respective brakes.

7. A braking system comprising, in combination, a plurality of brakes, a tensioned yielding device adjacent each brake acting in a direction to apply the brake, a single controlling member for all of the brakes, connections from said member to the various brakes, and yielding means adjacent the controlling member and acting through the connections to overcome said devices to prevent the application of the brakes by said yielding devices and arranged to be overcome by the controlling member to permit the several yielding devices to apply their respective brakes.

8. A braking system comprising, in combination, a plurality of brakes, a spring adjacent each brake acting in a direction to apply the brake, a single controlling member, connections to the various brakes, and a spring acting through the connections to overcome all of the springs adjacent the brakes and itself arranged to be overcome by the controlling member to permit the springs adjacent the brakes to apply their respective brakes.

9. A braking system comprising, in combination, a plurality of brakes, a spring adjacent each brake acting in a direction to apply the brake, a brake pedal, connections from the pedal to the various brakes, and a spring connected to the pedal and acting through the connections to overcome all of the springs adjacent the brakes and itself arranged to be overcome by the pedal to permit the springs adjacent the brakes to apply their respective brakes.

10. Retarding mechanism comprising, in combination, a brake, a spring adjacent the brake and constantly acting in a direction to apply the brake, another spring more powerful than said first spring and spaced some distance from the brake, tension connections through which said other spring normally acts to overcome said first spring to release the brake, and a controlling device for overcoming said other spring and permitting the first spring to apply the brake.

11. Retarding mechanism comprising, in combination, a brake, a spring adjacent the brake and constantly acting in a direction to apply the brake, another spring more powerful than said first spring and spaced some distance from the brake, and tension connections through which said other spring normally acts to overcome said first spring to release the brake.

In testimony whereof, I have hereunto signed my name.

ROBERT E. LYFORD.